United States Patent [19]
Butzko

[11] 3,785,762
[45] Jan. 15, 1974

[54] UNIVERSAL THERMOPLASTIC SHEET FORMING APPARATUS

[76] Inventor: Robert L. Butzko, c/o Thermtrol Corp., 165 Holland Ave., Bridgeport, Conn. 06605

[22] Filed: May 3, 1971

[21] Appl. No.: 139,632

[52] U.S. Cl. ............... 425/289, 425/388, 425/397, 425/398, 425/400, 425/412, 425/DIG. 220
[51] Int. Cl. ............................................. B29c 17/04
[58] Field of Search .................... 425/398, 292, 306, 425/400, 412, 161, 212, 307, 397

[56] References Cited
UNITED STATES PATENTS

| | | | |
|---|---|---|---|
| 3,105,270 | 10/1963 | Fibish | 425/145 |
| 3,346,923 | 10/1967 | Brown et al. | 425/162 |
| 3,359,600 | 12/1967 | O'Brien et al. | 425/157 |
| 3,504,074 | 3/1970 | Snow | 425/163 X |
| 3,561,057 | 2/1971 | Butzko | 425/214 |
| 3,513,505 | 5/1970 | Brown et al. | 425/306 X |
| 3,518,334 | 6/1970 | Carrigan et al. | 425/397 X |
| 3,632,250 | 1/1972 | Snow | 425/307 X |
| 3,357,054 | 12/1967 | Hartman, Jr. | 425/161 |
| 3,605,215 | 9/1971 | Young et al. | 425/161 X |

*Primary Examiner*—Robert L. Spicer, Jr.
*Attorney*—Mattern, Ware & Davis

[57] ABSTRACT

One or more heating stations, a dual action pressure-vacuum thermo-forming press, and a die-cutting press are located in line on a single machine. Thermoplastic sheet is fed from a supply roll under the heating stations and through the forming and cutting presses and then passed over a separating mechanism. Precise indexing of the thermo-formed parts from the forming press through the cutting press is provided by a pin chain carriage assembly. Pins on the chain engage the plastic sheet and hold it fixed with respect to the chain. The entire chain mechanism is mounted on a carriage which is reciprocated. When the carriage moves forward, parts are indexed from under the thermo-forming press to the first of one of more intermediate stations between it and the cutting press. When the carriage is reciprocated backwards, the chain is driven through a one-way clutch assembly such that the chain remains stationary with respect to the presses. Thus, on a subsequent reciprocation, the thermo-formed parts are precisely indexed in the cutting press. The cutting press is mounted on rails and may be positioned towards or away from the forming press to eliminate waste even when small parts are formed using single molds.

The thermo-forming press is provided with separate top and bottom platen-driving cylinders for universal adjustment of initial and final positions and strokes. The drive cylinders are mounted in a parallel battery below the top and bottom platens. Fixed parallel cold bars transverse to the carriage mechanism permit clamping of the sheet during thermo-forming. The cutting press is driven by a single cylinder through a toggle mechanism, providing a long down stroke on the top platen to engage the cutting die about the plastic parts in a self centering action prior to raising the lower platen against the parts to provide the cutting action.

22 Claims, 8 Drawing Figures

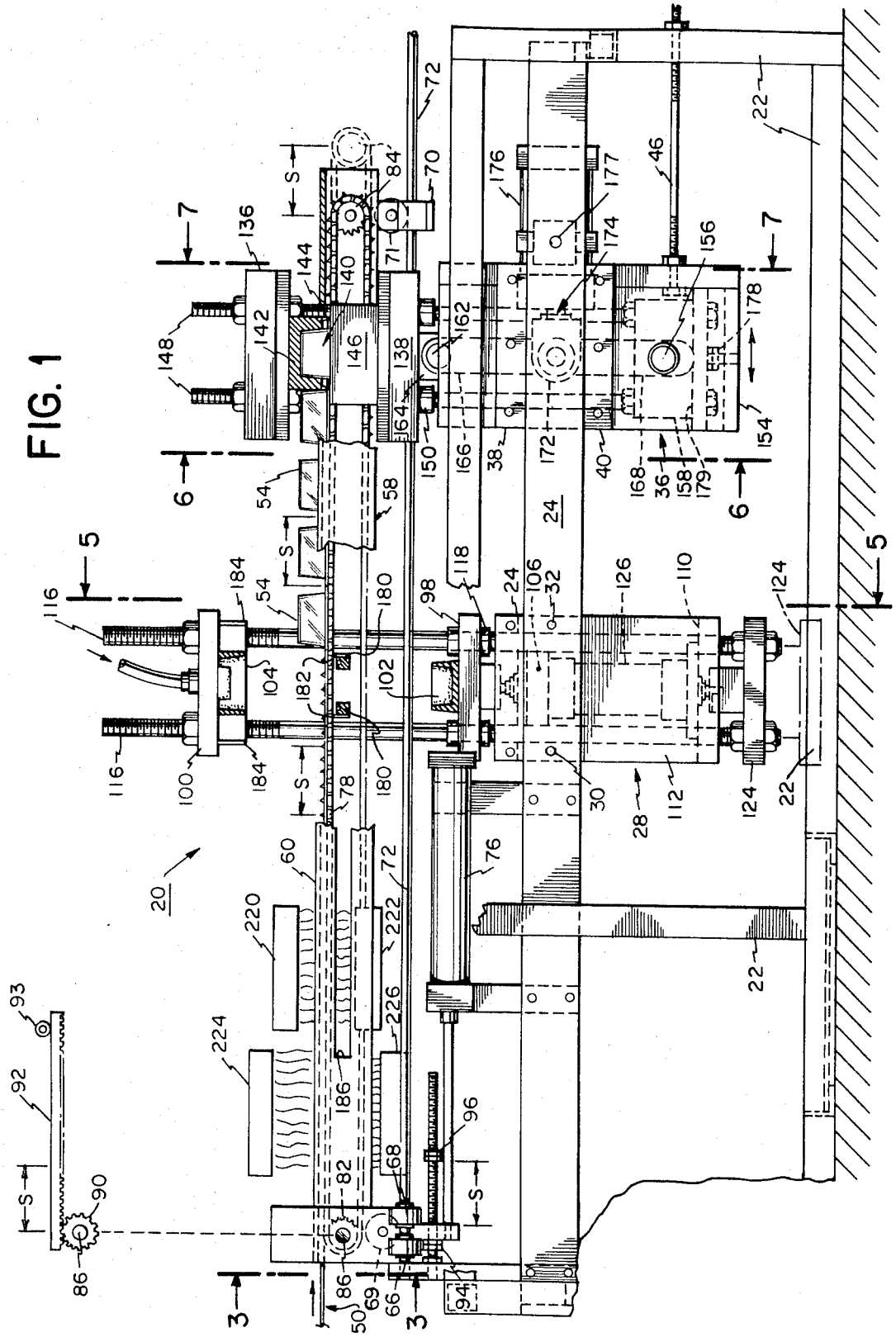

UNIVERSAL THERMOPLASTIC SHEET FORMING APPARATUS

SUMMARY OF THE INVENTION

This invention relates to universal thermo-plastic sheet-forming apparatus and more particularly to such apparatus capable of forming and cutting at two separate stations parts of any size less than the maximum dimensions of the cutting press. Many thermoplastic sheet-forming machines have been designed according to the prior art. Machines such as illustrated in my U.S. Pat. No. 3,561,057, issued Feb. 9, 1971, provide for precise cutting of thermo-formed parts, since the cutting dies are located coaxially with the forming molds, and the cutting action actually takes place in the forming press. However, since the cuting dies are located right next to the forming molds, there are various restrictions on the shapes of the parts which may be made on such a machine.

On the other hand, other machines according to the prior art have separate forming and cutting presses and the formed plastic parts must be indexed from the forming press to the cutting press. These machines, although able to form and cut a larger variety of plastic parts, have serious indexing problems. That is, the parts cannot be repetitively indexed under the cutting dies to close tolerances. This leads to parts having larger non-functional flanges than necessary, which vary in dimension, depending upon the speed that the machine is operated. Most machines according to the prior art move the plastic sheet with a chain mechanism bearing pins which pass through the edge of the plastic sheet. These chain mechanisms when driven relatively fast to provide quick indexing and high volume production tend to overrun due to the inertia of the chain. This overtravel is quite unpredictable, varying according to the amount of heating the sheet has undergone in the machine, which makes it relatively easier to move along than when it is cold, and other factors which will be apparent to those skilled in the art.

Thus, when highly accurate cutting is desired in the prior art, the parts are formed on one machine and then sent to a separate cutting machine. This transfer step greatly increases the labor costs of such parts.

Prior art machines having separate cutting and indexing stations employ presses which are large and unwieldy. The presses are fixed to a large heavy frame structure. When parts smaller than the press size are to be formed using a less expensive single mold, the distance between the presses may not be an integral number times the width of the parts. This results in large spaces between the formed parts on the plastic sheet, a consequent waste of material.

Prior art thermo-forming machines also provide restrictions on the user in the form and height of the molds they may use, since the machines have fixed strokes for the forming platens and fixed initial and final positions which restrict the way in which the molds may be machined. The forming presses of prior art machines are usually provided with chilled peripheral sheet-engaging means for holding the sheet during the thermo-forming process, and these means often make it difficult to construct molds for use on such machines.

Other problems of prior art thermo-forming machines having die-cutting presses independent of the thermo-forming presses I have found are caused by the restriction that the top and bottom platens of the die-cutting press meet at the plane of the sheet simultaneously. I have found that as a consequene the parts, although somewhat flexible, are unable to adjust themselves to the cutting dies, but that, if the upper female cutting die is allowed to engage the male portions of a part first, the part may be guided therein to closer tolerance registration prior to bringing up the lower platen to close the cutting dies and cut the part.

OBJECTS OF THE INVENTION

It is therefore a primary object of the invention to improve the art of thermo-forming plastic sheet.

Another object of the invention is to provide apparatus for forming and cutting thermoplastic articles from thermo-plastic sheet to close tolerances without restriction on the shape of the parts or the closeness of the cut to the formed portion of the part.

Still another object of the invention is to provide apparatus of the above character capable of forming parts of any size smaller than the maximum platen size provided with no wastage of thermoplastic sheet material and without the use of multiple molds.

Yet another object of the invention is to provide highly accurate plastic sheet indexing mechanism for apparatus of the above character.

Still another object of the invention is to provide apparatus of the above character comprising a vacuum-pressure press capable of universal adjustment of initial and final positions of top and bottom platens.

Yet another object of the invention is to provide compact mechanism for operating a thermo-forming press of the above character.

A further object of the invention is to provide sheet-holding apparatus for a forming press of the above character which does not restrict the nature of the forming dies employed.

Another object of the invention is to provide a die-cutting press for apparatus of the above character, providing a self-aligning feature.

Still another object of the invention is to provide a cutting press of the above character, providing very high cutting force.

Yet another object of the invention is to provide apparatus of the above character which is compact, relatively light in weight, convenient to use, and relatively inexpensive.

Other objects of the invention will in part be obvious and will in part appear hereinafter.

The invention accordingly comprises the features of construction, combination of elements, and arrangement of parts which will be exemplified in the construction hereinafter set forth, and the scope of the invention will be indicated in the claims.

For a fuller understanding of the nature and objects of the invention, reference should be had to the following description taken in connection with the accompanying drawings, in which:

THE DRAWINGS

FIG. 1 is a side view partially cut away, partially in phantom of universal thermo-forming apparatus according to the invention;

The same reference characters refer to the same elements throughout the several views of the drawings.

Apparatus according to the invention generally comprises conventional means for holding a roll of thermoplastic sheet; a novel reciprocating carriage on which are mounted parallel chains carrying pins for engaging the thermo-plastic sheets in a conventional manner; a gear mounted to the drive sprockets of the sheet-engaging chains through a one-way clutch such that the chains remain fixed with respect to the carriage upon forward motion of the carriage and are driven exactly equally and oppositely to the carriage upon backward motion of the carriage, thus keeping the sheet stationary during backward motion; heating means for heating the plastic sheeting; a fixed pressure-vacuum thermo-forming press; a movable die-cutting press which can be moved toward and away from the forming press; conventional means for separating the thermoplastic parts from the sheets together with takeup means for the separated strip the separating means being intermittently driven by reciprocation of the carriage mechanism; and controls for operating the indexing means and presses in synchronism.

The pressure-vacuum thermo-forming press generally comprises a top platen and a bottom platen. The bottom platen is driven by a cylinder located below it and the top platen is driven by a pair of cylinders on opposite sides of the bottom cylinder below the bottom platen and driving the top platen by means of rods passing up through the bottom platen on which the top platen is mounted. The die-cutting press comprises a top and bottom platen, which are driven by a toggle mechanism similar to that disclosed in any above-identified U.S. Pat. No. 3,561,057. The toggle mechanism is arranged such that a novel cutting action is employed wherein the upper die comes down around the part, providing a self centering action, and thereupon the lower platen raises up to complete the cutting action. Non-reciprocating cold bars are provided at the cutting press which may be engaged by separate upper knives to hold the plastic sheet during forming. The cold bars which are parallel and transverse to the chains may be adjusted laterally for different size parts.

SPECIFIC DESCRIPTION

Figure 5:
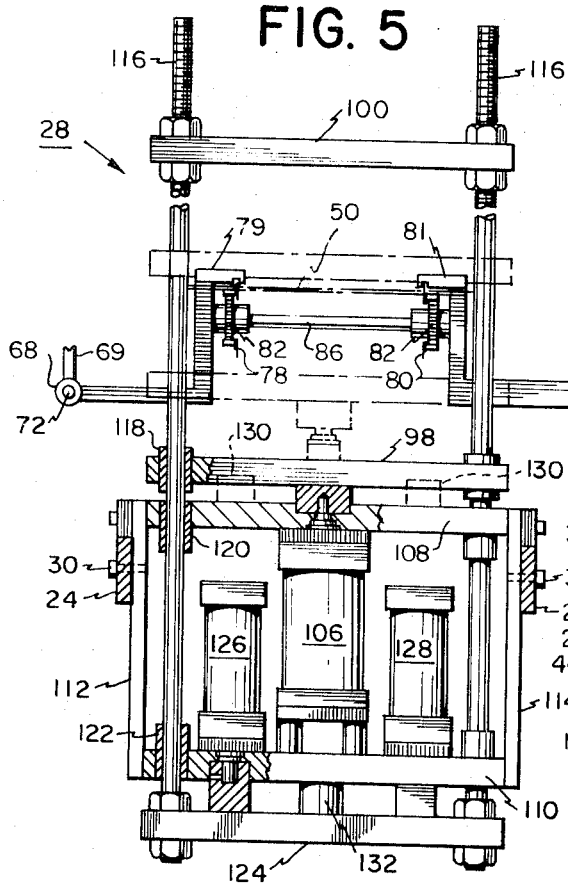
FIG. 5 is a fragmentary cross-sectional view taken along the lines 5—5 of FIG. 1.

More specifically referring to FIG. 1, a thermo-forming machine according to the invention, generally indicated at 20, comprises the usual rigid frame structure 22, to which are mounted a pair of rigid rails 24 and 26 (see also FIG. 5). A thermo-forming pressure-vacuum press, generally indicated at 28, is mounted on rails 24 and 26 by means of screws 30 and 32, as seen in FIG. 1, and another pair of screws 34, only one of which may be seen in FIG. 5.

Figure 6:
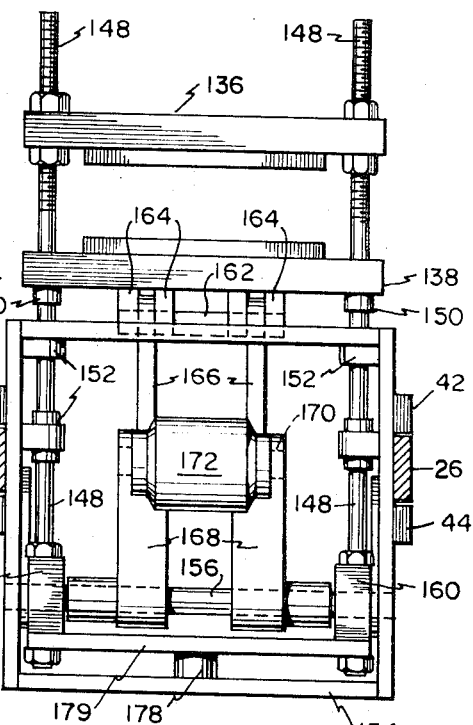
FIG. 6 is a fragmentary cross-sectional view taken along the lines 6—6 of FIG. 1.

A cutting press, generally indicated at 36, is also mounted on rails 24 and 26 between pairs of guide rails 38 and 40 and 42 and 44 (FIG. 6). The die cutting press 36 may be positioned towards and away from the thermo-forming press 28 by means of adjustable positioning members 46, only one of which is shown.

Figure 2:
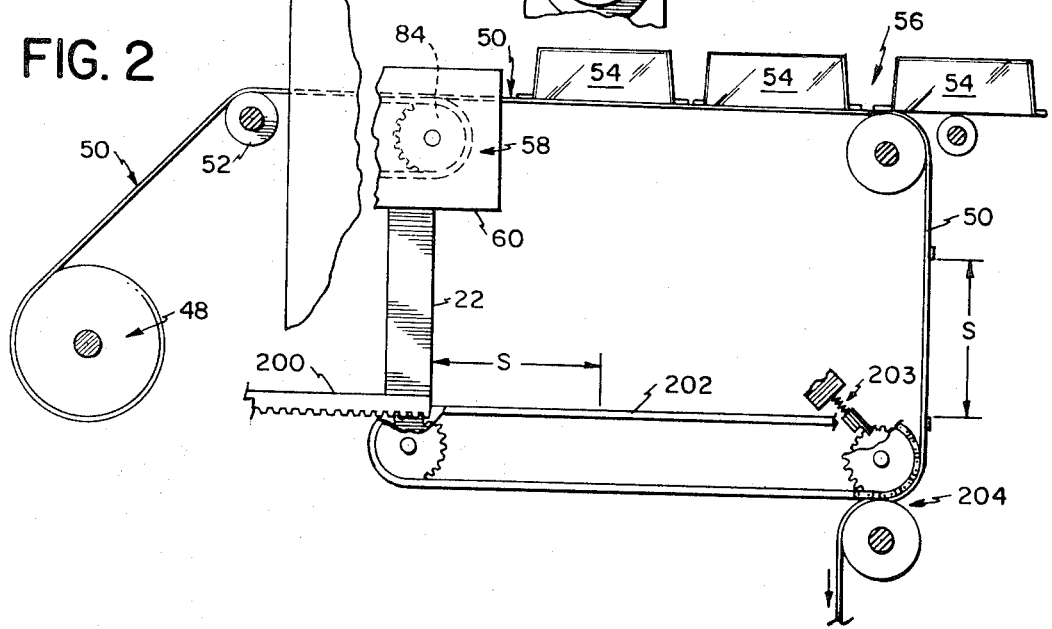
FIG. 2 is a fragmentary side view of the apparatus of FIG. 1 showing portions of the apparatus cut away in FIG. 1.

Now referring to FIG. 2, a conventional supply reel 48 of thermoplastic sheet 50 is mounted on the frame 22 in a conventional manner by means not shown, and the sheet 50 is fed over a guide roller 52 at the left end of the machine shown in FIG. 1. After the parts have been formed, the sheet 50 with the parts 54 formed thereon is supplied to a separating mechanism generally indicated at 56 in FIG. 2, which is mounted to the frame 22 by means which are not shown in detail. At the separating mechanism 56, the parts 54 are separated from the remaining sheet 50 in a conventional manner.

Again referring to FIG. 1, the sheet 50 enters the machine from the left and is supplied to a carriage mechanism generally indicated at 58. The carriage 58 comprises a frame structure 60 supported by means of sleeve bearings 66, 68 and 70 on an elongated guide rail rod 72 and supported on the other side on a square rail 74, as shown in FIG. 5. The carriage 58 is reciprocated upon rails 72 and 74 by means of a fluid cylinder actuator 76 mounted on rail 24. Roller wheels 69 and 71 assist in guiding the carriage 58 on rail 72.

Figure 3:
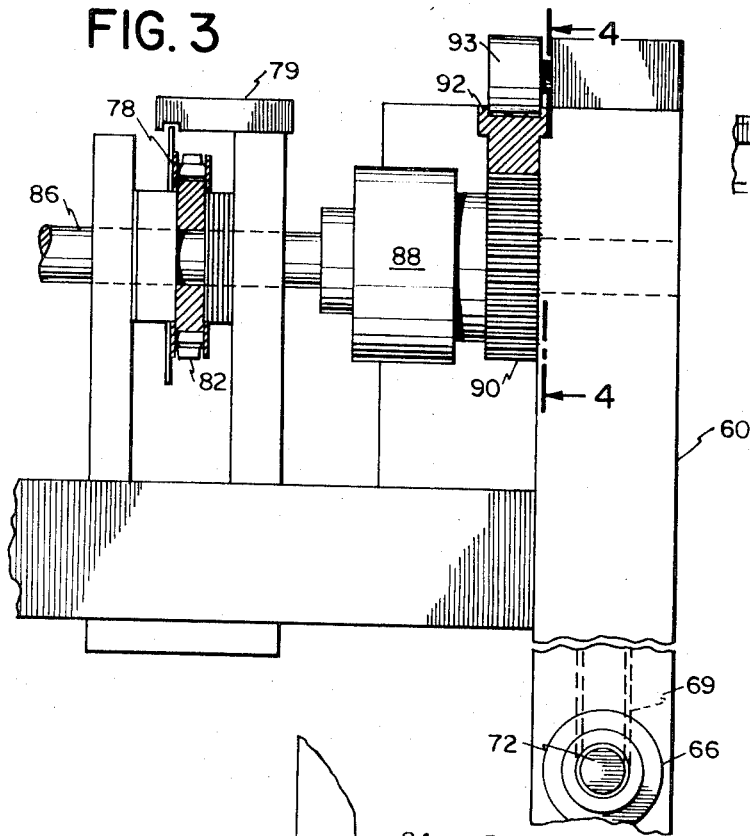
FIG. 3 is a fragmentary cross-sectional view taken along the lines 3—3 of FIG. 1.
Figure 4:
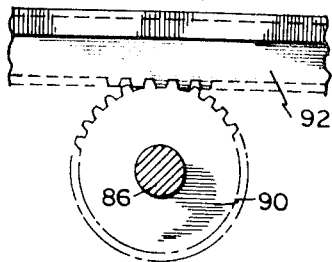
FIG. 4 is a fragmentary cross-sectional view taken along the lines 4—4 of FIG. 3.

The carriage 58 further comprises a pair of pin chain belts 78 and 80 (FIG. 5), which engage and guide the sheet under chanelled guides 79 and 81 in the conventional way. The chains 78 and 80 are mounted on end sprockets 82 at the left end of the carriage, as seen in FIG. 1, and end sprockets 84 at the right end of the carriage, as seen in FIG. 1. The sprockets 82 are mounted on a common shaft 86 (FIG. 3). The sprockets 82 are keyed to the shaft 86 so that they are driven together. The shaft 86 is connected to a one way clutch 88, which is driven by a gear 90, gear 90 being driven by rack 92. Rack 92 is mounted at one end to the frame 22. To insure contact between the rack 92 and gear 90, roller 93 is mounted to the top of carriage frame 60 as shown in FIG. 3.

Gear 90 and sprockets 82 have the same effective diameter. The one way clutch 88 is connected such that the shaft 86 is rotated only upon backward motion of the carriage 58 from the right to the left, as seen in FIG. 1. Thus, on forward motion of the carriage 58, the plastic sheet 50 is indexed the distance traveled by the carriage 58. This distance S may be adjusted by adjusting the stops 94 and 96, seen in FIG. 1.

When the carriage 58 returns to the left, rotation of the shaft 86 on which the sprockets 82 are mounted causes the two chains to remain stationary with respect to the entire apparatus 20, readying the carriage mechanism 58 for the next indexing reciprocation.

Referring to FIGS. 1 and 5, the thermo-forming pressure-vacuum press, generally indicated at 28, comprises a bottom platen 98 and a top platen 100 on which are mounted a mold 102 and a mold assist 104. The bottom platen 98 is pressed upwardly by a fluid actuator 106 mounted rigidly between an upper fixed plate 108 and a lower fixed plate 110 which with tie plates 112 and 114 form a rigid frame for the thermo-forming press 28. Upper platen 100 is adjustably mounted on four reciprocating shafts 116 movable in sleeve bearings 118 in bottom platen 98, sleeve bearings 120 in rigid top plate 108, and sleeve bearings 122 in rigid bottom plate 110. A lower reciprocating plate 124 is mounted to shafts 116 and is moved by means of the fluid actuators 126 and 128, which are mounted to the rigid bottom plate 110. Stops 130 and 132 may be mounted to plates 108 and 110 to limit the open positions of the top and bottom platens 98 and 100. The closed positions of the platens 98 and 100 are at the plane of the sheet 50. Normally the top platen is actuated first down against the sheet, then the bottom platen is pushed up to close the mold. The top platen is provided with slightly greater force than the bottom platen and thus defines the closed position.

Figure 7:
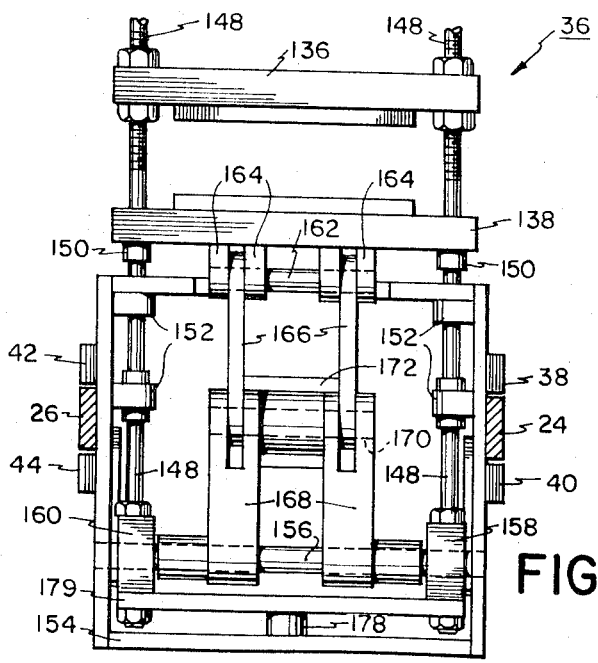
FIG. 7 is a fragmentary cross-sectional view taken along the lines 7—7 of FIG. 1.

The cutting press 36, as seen in FIGS. 1, 6 and 7, comprises a top platen 136 and a bottom platen 138 on which are mounted the cutting dies, generally indicated at 140. In the illustrated embodiment of the invention, the cutting dies comprise a female guiding die 142 having cutting knives 144 mounted on top platen 136, and a lower cutting plate 146 mounted on bottom platen 138. As in the thermo-forming press 28, the top platen 136 is adjustably mounted on four shafts 148. The shafts 148 are reciprocated through sleeve bearings 150 in the bottom platen and sleeve bearings 152 mounted to the rigid frame 154 of the cutting press 36.

The cutting press platens 136 and 138 are operated by a toggle mechanism mounted between the bottom platen 138 and a shaft 156 adjustably mounted to the lower end of the rods 148 at tie plates 158 and 160. The toggle mechanism is connected to the bottom platen 138 at shaft 162 mounted thereon by trunnions 164. The upper toggle arm comprises a pair of arms 166, and the lower toggle arm also comprises a pair of arms 168, which can rock on the shafts 162 and 156 respectively. The toggle arms 166 and 168 are tied together on a common shaft 170, to which is also mounted an actuator head 172.

Figure 8:
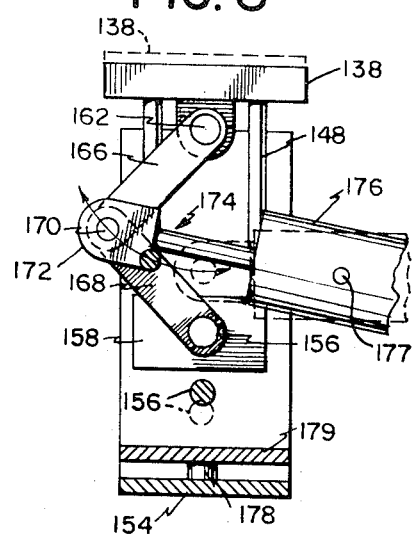
FIG. 8 is a schematic diagram illustrating the operation of the cutting press of the apparatus of FIG. 1.

Actuator head 172 is connected to the shaft 174 of a fluid actuator 176, best seen in FIG. 1. As shown diagramatically in FIG. 8, the toggle is opened by pushing the actuator head 172 to the left, as seen in FIGS. 1 and 8, and closed by pulling the actuator head 172 to the right to the position shown in FIG. 1. As explained below, the actuator 176 rocks on shaft 77 mounted to frame 154.

As best seen in FIG. 8, starting in the full open position, the central shaft of the toggle 170 is all the way to the left; the bottom platen 138 is at its lowermost position; and the upper platen 136 is at its highest position, as indicated by solid lines. In closing the press, shaft 170 is pulled to the right to the position shown in cross section. Because of the weight of the structure, during this movement the bottom platen 138 does not move. However, shaft 156 moves to the position shown in cross-section. Shaft 156 continues to move until a bottom-most tie plate 179 mounted to shaft 148 (see FIG. 6) engages stop 178 mounted on the frame structure 154, thus defining the lowermost position of the upper platen 136, the lowermost position attained by shaft 156 being shown in dotted lines. Thereafter, as the actuator 174 pulls the shaft 170 to the right, as seen in FIG. 8, the lower platen 138 is raised only one half inch to the position shown by the dotted line. In this way, the upper female die 142 may be moved five inches to engage the male portion of the part 54 and self-center the part under the cutting knives 144 prior to the small movement of the lower cutting plate 146 to complete the die cut. Those skilled in the art will understand that the knives 144 could also be located on the lower plate 146, if desired.

Another feature of the machine is the convenient positioning of cold bars 180 on either side of the molds 102 and 104, on which are mounted holding knives 182, which cooperate with the lower edges 184 of the mold assist 104 to clamp the sheet 50 during the molding operation. Cold bars 180 have conduits therein for cooling fluid and are mounted in a channel 186 in the carriage 58. Thus, they may be conveniently spaced closer together or farther apart, depending on the size of the part being formed. This eliminates the need for separate closed clamping members as in the prior art machines, which greatly restrict the form of the molds used and require separate holding members for different sizes and shapes of parts.

Summarizing the operation of the machine, the sheet 50 is fed in the machine from the left (see FIG. 1) to the carriage mechanism generally indicated at 58, where it is clamped between the pins of the chains 78 and 80 and the upper grooved plates 79 and 81 (as best seen in FIG. 5). The material is indexed to the right by movement of the carriage mechanism 58 under control of the actuator 76. This indexing is of an amount S equal to the width of the part or parts being made in one operation of the thermo-forming press 28. The thermo-forming press 28 provides universal adjustment of stroke and very convenient means 182 for clamping and holding the sheet 50 during the thermo-forming process.

The parts 54 are then indexed through one or more blank stations during which they cool until they come under the cutting press 36, which may be adjusted before the parts are formed by means of adjustment bar 46, so that the distance between the thermo-forming molds 102 and 104 and the cutting dies 142 are exactly a multiple of the parts' width S. As previously stated, during the forward indexing of the carriage a distance S equal to the part width S, the chain 78 moves with the carriage 58. However, on the return stroke, the one-way clutch 88 engages and drives the chain under the action of the stationary rack 92, causing the chain to remain stationary keeping the parts 54 in position with respect to the machine 20. This reverse motion preferably takes place during the thermo-forming and cutting cycle when the presses 28 and 36 are closed, which aids in holding the sheet 50, and provides a long period of time for the reverse stroke of the carriage so that the chain does not need to be driven fast and inertial problems may be avoided.

The cutting action provided by the cutting press 36, wherein the upper die registers with the part before the lower die moves a short distance to complete the cut, provides for compensation for minor variations in the parts as they are molded and indexed. The stripper mechanism 56 shown in FIG. 2 is actuated incrementally. Since rack 200 is mounted to the carriage 58, it drives a chain mechanism 202 through a slip clutch (not shown). Pawl gear mechanism 203 prevents back motion. The sheet 50 is thus indexed between rollers generally indicated at 204 the indexing distance S each time the carriage 58 is reciprocated.

Those skilled in the art will note that the chains 78 and 80 of the carriage 58 are required to engage new material and be driven only on the return stroke, and that during this period they are climbing onto cold sheet 50, thus providing reproducible friction conditions and leading toward the high indexing accuracies produced by apparatus according to this invention.

The machine 20, as seen in FIG. 1, may be provided with one or more pairs of heaters 220, 222 and 224 and 226 for heating the thermoplastic sheet 50 prior to molding.

Those skilled in the art will understand that the machine may be operated through any conventional cutting and forming cycle by conventional controls, which form no part of the present invention. The molds 102 and 104 of FIG. 1 may be supplied with vacuum or pressure as desired. The actuators may be actuated by hydraulic or pneumatic means, whichever is more convenient for the forces and conditions under which the machine is to be operated. Furthermore, the chains 78 and 80 are preferably mounted on the carriage 58 such that the space between them may be varied to handle various widths of plastic sheet 50. Other necessary and desirable features of a commercial machine will be obvious to those skilled in the art and are not shown or discussed here in detail.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by letters patent is:

1. A universal thermoforming machine comprising:
   A. a forming press;
   B. a cutting press;
   C. indexing mechanism for feeding sheet material therebetween comprising:
      a. a reciprocating carriage,
      b. holding means movably mounted on said carriage for continuously engaging and holding at least one edge of a sheet,
      c. means for driving said holding means, said sheet and said carriage together when said carriage moves in one direction, and,
      d. means for causing said holding means and said sheet to remain stationary when said carriage moves in the opposite direction.

2. A universal thermoforming machine as defined in claim 1, and:
   D. means for adjusting the spacing between said forming and said cutting presses.

3. A universal thermoforming machine comprising;
   A. a forming station;
   B. a cutting station;
   C. a carriage for indexing parts from said forming station to said cutting station;
   D. an endless loop conveyor mounted on said carriage;
   E. means for reciprocating said carriage; and,
   F. means for causing said endless loop conveyor to remain stationary with respect to said carriage when said carriage moves in one direction and to cause a portion of said endless loop conveyor to remain stationary with respect to said stations when said carriage moves in the opposite direction.

4. A universal thermoforming machine as defined in claim 3 wherein said last named means comprises:
   a. a pulley mounted on said carriage for driving said conveyor,
   b. a rack mounted in a fixed position with respect to said stations,
   c. a pinion for engaging said rack mounted on said carriage having the same effective diameter as said pulley, and
   d. a one-way clutch mounted between said pinion and said pulley.

5. A universal thermoforming machine as defined in claim 3, and
   G. means for adjusting the spacing between said forming and said cutting presses.

6. A universal thermoforming machine comprising:
   A. a molding press; and,
   B. a cutting press comprising:
      a. a shaped die for engaging and centering a preformed part to be cut;
      b. a mating die, said dies when pressed together cutting a part located between them;
      c. means for first moving said shaped die into centering engagement with a similarly shaped part to be cut and for then pressing said mating die against said shaped die to cut the part;
   C. indexing mechanism for feeding sheet material therebetween comprising;
      a. a reciprocating carriage,
      b. holding means movably mounted on said carriage for continuously engaging and holding at least one edge of a sheet,
      c. means for driving said holding means, said sheet and said carriage together when said carriage moves in one direction, and,
      d. means for causing said holding means and said sheet to remain stationary when said carriage moves in the opposite direction.

7. A universal thermoforming machine as defined in claim 6, and:
   D. means for adjusting the spacing between said molding and said cutting presses.

8. A universal thermoforming machine as defined in claim 6, wherein said molding press comprises:
   a. a plurality of parallel shafts,
   b. a top platen mounted to said shafts,
   c. a bottom platen journaled to said shafts,
   d. a rigid structure in which said parallel shafts are journaled,
   e. a first fluid cylinder mounted to said rigid structure and to said bottom platen for exerting a force therebetween,
   f. a movable bottom plate mounted to said shafts, and,
   g. a second fluid cylinder mounted to said rigid structure and to said movable bottom plate for exerting a force therebetween.

9. A universal thermoforming machine as defined in claim 8, wherein said molding press further comprises:
   h. a pair of parallel, transversely adjustable, cooled knives mounted just below said holding means and, i. a mating pair of knives mounted to one of said platens for holding material being formed in the molding press.

10. A universal thermoforming machine as defined in claim 6, and:
C. a carriage for indexing parts from said molding press to said cutting press;
D. an endless loop conveyor mounted on said carriage;
E. means for reciprocating said carriage; and,
F. means for causing said endless loop conveyor to remain stationary with respect to said carriage when said carriage moves in one direction and to cause a portion of said endless loop conveyor to remain stationary with respect to said stations when said carriage moves in the opposite direction.

11. A universal thermoforming machine as defined in claim 10, wherein said last named means comprises:
a. a pulley mounted on said carriage for driving said conveyor,
b. a rack mounted in a fixed position with respect to said stations,
c. a pinion for engaging said rack mounted on said carriage having the same effective diameter as said pulley, and
d. a one way clutch mounted between said pinion and said pulley.

12. A universal thermoforming machine as defined in claim 10, and
G. means for adjusting the spacing between said forming and said cutting presses.

13. A universal thermoforming machine as defined in claim 10, wherein said moving means of said cutting press comprises a toggle.

14. A universal thermoforming machine as defined in claim 13, wherein said moving means of said cutting means moves said shaped die through a distance substantially at least ten times greater than it moves said mating die.

15. A universal thermoforming machine as defined in claim 14, wherein said moving means of said cutting means moves said mating die a distance substantially equal to one-half inch.

16. A universal thermoforming machine as defined in claim 10, wherein said cutting press further comprises:
d. a plurality of parallel shafts,
e. a top platen mounted to said shafts on which said shaped die is mounted,
f. a bottom platen journaled on said shafts on which said mating die is mounted,
g. a movable bottom plate mounted to said shafts, and,
h. a rigid structure in which said parallel shafts are journaled,
and wherein said moving means comprises:
1. a stop for limiting the downward motion of said movable bottom plate;
2. a toggle comprising a knee shaft mounted between said bottom platen and said movable bottom plate; and,
3. a fluid cylinder acting on said knee shaft to straighten said toggle, said knee shaft being free to move in an arc whereby as said toggle is straightened said upper platen is first caused to move down with no motion of said bottom platen until said movable bottom plate engages said stop and the said bottom platen is then caused to move up a smaller distance than said upper platen is moved.

17. A cutting press for a universal thermoforming machine comprising:
A. a shaped die for engaging and centering a preformed part to be cut;
B. a mating die, said dies when pressed together cutting a part located between them;
C. means for first moving said shaped die into centering engagement with a similarly shaped part to be cut and for then pressing said mating die against said shaped die to cut the part,
D. a plurality of parallel shafts;
E. a top platen mounted to said shafts on which said shaped die is mounted;
F. a bottom platen journaled on said shafts on which said mating die is mounted;
G. a movable bottom plate mounted to said shafts; and,
H. a rigid structure in which said parallel shafts are journaled,
and wherein said moving means comprises:
a. a stop for limiting the downward motion of said movable bottom plate;
b. a toggle comprising a knee shaft mounted between said bottom platen and said movable bottom plate; and,
c. a fluid cylinder acting on said knee shaft to straighten said toggle, said knee shaft being free to move in an arc whereby as said toggle is straightened said upper platen is first caused to move down with no motion of said bottom platen until said movable bottom plate engages said stop and the said bottom platen is then caused to move up a smaller distance than said upper platen is moved.

18. A cutting press as defined in claim 17, wherein said moving means moves said shaped die through a distance substantially at least ten times greater than it moves said mating die.

19. A cutting press as defined in claim 18, wherein said moving means moves said mating die a distance substantially equal to one-half inch.

20. A universal thermoforming machine as defined in claim 1 and:
e. a reciprocating force producing member for driving said carriage, and,
f. at least one adjustable stop for adjusting the stroke of said member.

21. A universal thermoforming machine as defined in claim 20 and:
D. means for adjusting the spacing between said forming and said cutting presses.

22. A universal thermoforming machine as defined in claim 3 wherein said endless loop conveyor comprises a chain and said pulley is a sprocket pulley about which said chain is engaged.

* * * * *